United States Patent

[11] 3,575,160

[72] Inventors Alexander A. Vass;
Clara Vass, 309 E. 87th St., New York, N.Y. 10028
[21] Appl. No. 775,486
[22] Filed Nov. 13, 1968
[45] Patented Apr. 20, 1971
Continuation-in-part of application Ser. No. 670,603, Sept. 26, 1967, now Pat. No. 3,469,575.

[54] INSTRUMENTS FOR ADMINISTERING FLUIDS INTO THE INTESTINAL TRACT PER RECTUM
15 Claims, 6 Drawing Figs.
[52] U.S. Cl. .................................................. 128/2R, 128/239, 128/245
[51] Int. Cl. .................................................. A61m 3/00
[50] Field of Search .......................................... 128/2, 234—245, 248, 251

[56] References Cited
UNITED STATES PATENTS
| 315,860 | 4/1885 | VanBuskirk | 128/239 |
| 1,566,061 | 12/1925 | Ziegler | 128/245 |
| 1,871,523 | 8/1932 | Howard | 128/239 |
| 1,926,608 | 9/1933 | Ziegler | 128/239 |
| 1,947,150 | 2/1934 | Bacon | 128/239 |
| 2,457,244 | 12/1948 | Lamson | 128/246 |
| 2,474,188 | 6/1949 | Pohl | 128/239 |
| 2,630,805 | 3/1953 | Brehm | 128/242 |
| 2,631,586 | 3/1953 | Reilly | 128/242 |
| 3,422,814 | 1/1969 | Lloyd | 128/245 |

FOREIGN PATENTS
| 8,373 | 1887 | Great Britain | 128/245 |
| 21,351 | 1904 | Great Britain | 128/245 |
| 308,256 | 5/1933 | Italy | 128/241 |

Primary Examiner—Richard A. Gaudet
Assistant Examiner—Ronald L. Frinks
Attorney—Victor M. Helfand ABSTRACT: An instrument for administering fluid into the intestinal tract per rectum, which includes a tube having a rectum entering end portion, the tube having enlargements distally of said end portion engageable against the body area surrounding the anal opening of the rectum and entering thereinto for sealing the same when said end portion is disposed within the rectum, to seal the anal orifice, and another enlargement distally spaced from said first enlargements and engageable by body portions spaced distally from the anal opening for retaining the instrument in place after it is in anal orifice sealing position.

PATENTED APR 20 1971
3,575,160
SHEET 1 OF 2
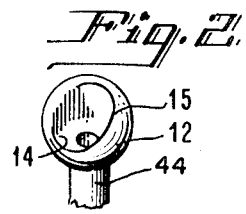
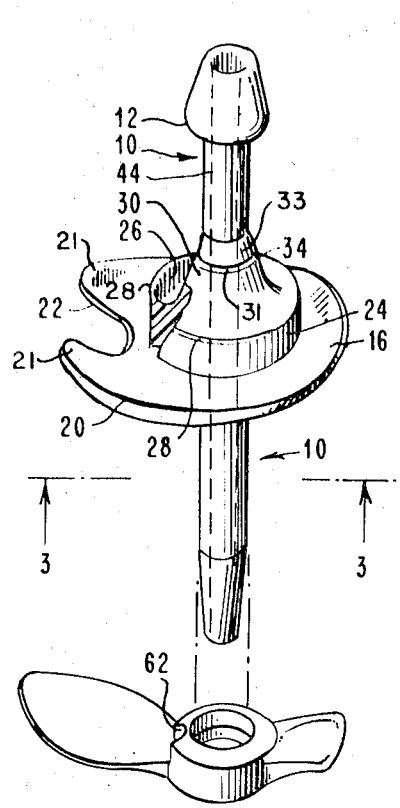
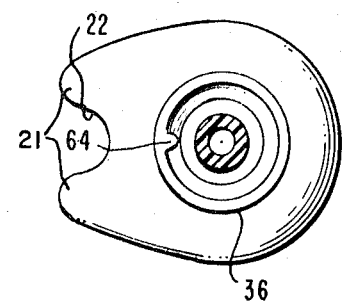
INVENTORS
ALEXANDER VASS
CLARA VASS
BY
ATTORNEY

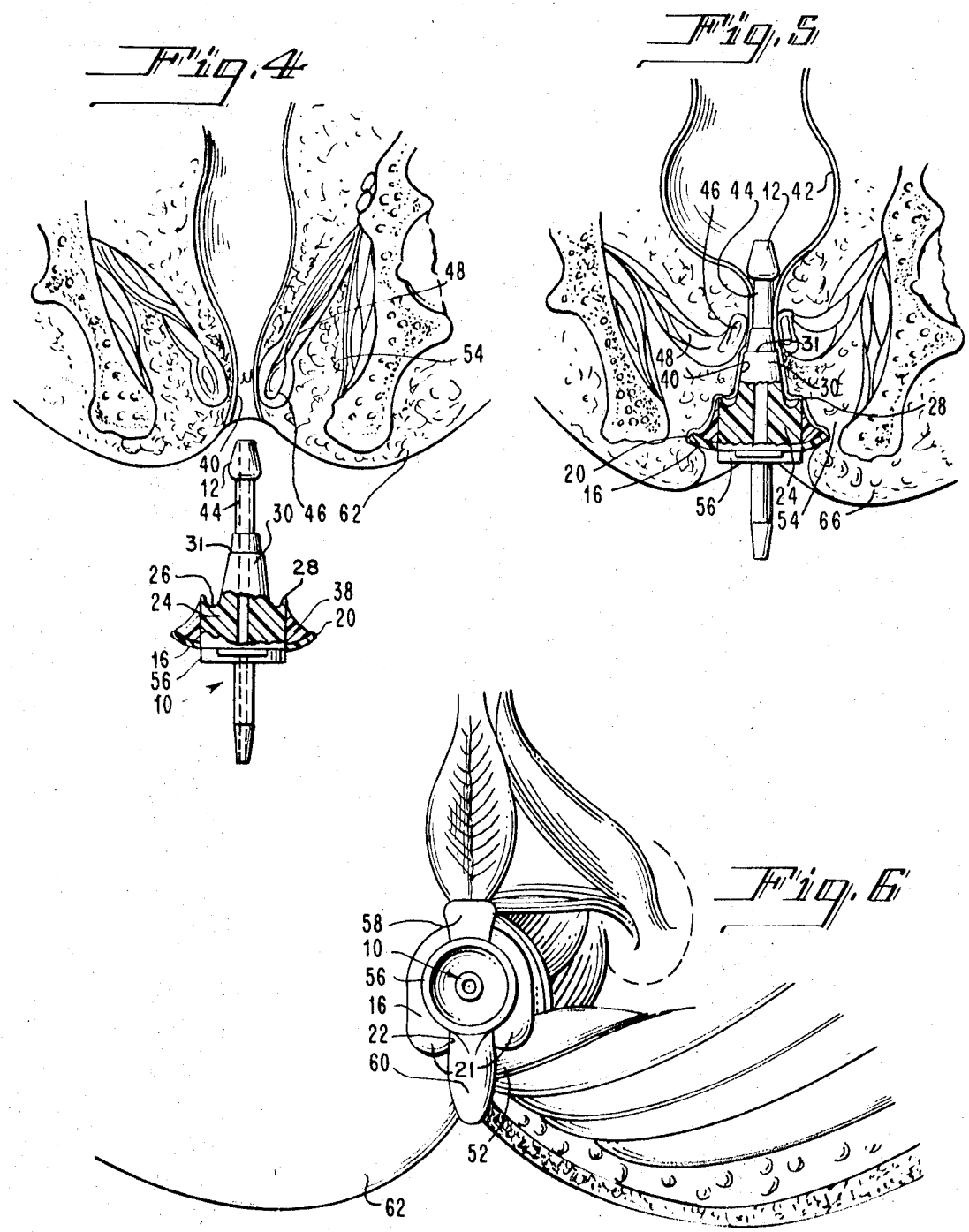

INSTRUMENTS FOR ADMINISTERING FLUIDS INTO THE INTESTINAL TRACT PER RECTUM

This application is a continuation-in-part of copending application Ser. No. 670,603, filed Sept. 26, 1967, now U.S. Pat. No. 3,469,575.

The present invention relates to an instrument for use in administering contrast fluid into the intestinal tract, per anum, as practiced in the radiological diagnostic procedure of the barium enema.

Prior art instruments of the character described operated imperfectly in that they were unable to completely seal the anal orifice against leakage of fluid, especially after buildup of pressure within the intestinal tract, and were frequently dislodged under such pressure, resulting in a loss of fluid and an imperfect and incomplete opacity of the intestinal tract.

Efforts have heretofore been made to cure the latter defect by the enlargement of the end of the instrument within the rectum. However, such efforts have not proven completely effective and also present a danger of damage to the interior intestinal wall.

The present invention is directed to the provision of an instrument of the character described that will effectively seal the anal orifice against leakage of the administered fluid and will, at the same time, prevent dislodgement of the instrument from anal sealing position.

Broadly stated, the instrument of the present invention is designed to seal the intestinal tract entirely from the exterior thereof, without blocking or obstructing any part thereof, by providing the instrument with enlargements that fit into the anal canal to close the same and, at the same time contact and press against the marginal body edge portion surrounding the anal orifice to provide a tight seal around such orifice. In immobilizing the instrument after it is in sealing position, the present invention takes cognizance of two anatomical features. One feature is the bony outlet of the pelvis around the anus. The other feature is the muscular-skin raphe in the depth of the cleft space between the buttocks. The present invention provides means on the instrument that is engageable by both, the ends of such bony structure and by the muscular-skin raphe, after it is in anal orifice sealing position, for immobilizing the same against shifting, or dislodging.

The foregoing and other objects and advantages of the instrument of the present invention will become more readily apparent to those skilled in the art from the embodiment thereof shown in the accompanying drawings and from the description following. It is to be understood, however, that such embodiment is shown by way of illustration only, to make the principles and practice of the invention more readily comprehensible, and without any intent of limiting the invention, to the specific details therein shown.

In the drawings:

FIG. 1 is an exploded view of one embodiment of an instrument of the present invention, partly broken away and in section, to illustrate details of construction;

FIG. 2 is a fragmentary, elevational view of a modified form of nozzle discharge head for use with the instrument of the invention;

FIG. 3 is a section taken on line 3—3 of FIG. 1;

FIG. 4 is a sectional, more or less diagrammatic depiction through the body of a person showing the anus and rectum and surrounding bone, muscular and skin structure in normal position, with the instrument in readiness for insertion; the latter being shown partly in section;

FIG. 5 is a view similar to that of FIG. 4, with the instrument in fluid administering position on the body; and FIG. 6 is a plan view, as seen from the outer or distal end of the applicator, when in administering position; the body being shown in section.

Referring in detail to the embodiment of the invention shown in the drawings, the same is shown to comprise a tube, 10, preferably of uniform bore, which may at its body entering or proximal end have an enlarged head 12, which may taper toward its end, as shown in FIG. 1; or, as shown in FIG. 2 may be approximately spherical and have an enlarged, substantially cylindrical bore, 14, of a diameter greater than the bore of tube 10, with its longitudinal axis disposed at an angle to the longitudinal axis of tube 10, to provide the obliquely disposed opening 15.

Formed around tube 10, at a distance from the body-entering end or head 12 is an anus sealing structure comprising an enlargement, 24, surrounding tube 10 and formed preferably of circular shape and concentric therewith. Enlargement 24 is formed with a surface, 26, that faces the proximal end of tube 10 and is generally radially normal to the longitudinal axis of tube 10. Extending from the midportion of surface 26 is a conically shaped, studlike enlargement, surrounding and concentric with tube 10 and tapering in the direction of the anus entering end thereof. The area of surface 26 surrounding stud 30 is preferably concaved, to provide the proximally raised or projecting edge, 28.

Conical stud 30 is of a size adapted to fit within and close the anal orifice 40, as the tube end or head 12 is inserted therethrough into the rectum, and surface 26 with raised edge 28 are arranged to be placed, at the same time, against the perianal surface, or the marginal body edge portion of the anal orifice, and pressed thereinto, to form a double seal.

Conical stud 30 may be interrupted adjacent its proximal end by a shoulder, 31, that may serve to replace the protruding, redundant mucous lining occasionally found in a rectum. The proximal end, 33 of stud 30 forms a cone of reduced cross section.

To retain the instrument of the invention on the body in the anus sealing position described above, tube 10 is provided, in distally spaced relation to surface 26, with a second enlargement, of greater size than surface 26 and also generally radially normal to the longitudinal axis of tube 10, which extends through a central portion of such enlargement. Such enlargement may be formed as a plate, 16, which is preferably heart-shaped, having lobes, 21, separated by a cleft, 22, in a portion of its edge. Lobes 21 are proximally curved, as illustrated and for a purpose which will hereafter be made clear, and the remaining edge portions of plate 16 may likewise be proximally curved.

Preferably, enlargements 24 and 16 may be integrally formed, with the former comprising a circular stud rising from the midportion of the proximal surface of plate 16, around tube 10. If desired, the stud enlargement 24 may be made to widen distally, as by applying thereover a proximally tapering ring or collar, 38, which rests on the proximal surface of plate 16, and which may, if desired, be formed of rubber or plastic material.

In using the applicator, the head 12 is gently pressed through the anus, 40, into the lower rectum, 42, the neck, 44, between the head 12 and the tapered stud extension 30 being of sufficient length for that purpose. As will be seen from FIGS. 4 and 5, the movement of the enlarged head 12 into the lower rectum 42, which may be done under gentle pressure, tends to push the anal sphincter muscles, 46, inwardly into the rectum; at the same time also moving the levator ani muscles, 48, inwardly, as more or less diagrammatically illustrated in FIG. 5 of the drawing. Such movement of the applicator will bring the tapered stud extension 30 into the anal opening, 40, at the same time bringing the flange 28 of the cylindrical stud 24 into contact with the body area around the anal opening, pressing into the same with the body tissue pressing into and filling the grooved surface 26, so as to form a sealing contact therewith. Such movement of the applicator also brings the flange edge 20 of the plate 16 into contact with the buttocks, 66, to each side of the anal opening; the cleft or recess 22 straddling the ano-coccygeal ligament 52 without painful contact therewith, and the lobes, 21, adjacent the cleft 22 to each side thereof depressing the buttocks flesh contacted by it and overlying and pressing over and into the ischiorectal space, 54. It will be clear that as the portions of the body, including the buttocks, to each side of the anus are compressed toward one another, as will be done, more or less instinctively, in response to the pressure against and within the anus, the indentation formed by the flanged edges 20 of the plate 16 in such body portions will be deepened and the flesh will overlap on both sides of the plate, to thereby automatically immobilize the applicator and retain the nozzle within the rectum against even partial displacement. Further, such action of the body upon the applicator will prevent the anal sphincter muscles and the levator ani muscles from returning to normal position and they will tend to press against the tube 10 below the head 12, to provide a sealing effect at that point. Additionally, where the ring 38 is applied around the cylindrical stud 24 it will act both as an additional frictionally acting, body contacting surface.

Immobilization of the applicator may be further assured by manually pressing the buttocks 66 toward one another and applying to them, across the cleft between them, a strip of adhesive, in a manner readily understood and not thought necessary to illustrate.

The device of the present invention may also include means for orienting the applicator with the cleft 22 facing the anterior of the body and also serving the purpose of further immobilizing the instrument against shifting in a saggital direction when inserted within the body. Such means may also serve as a convenient handle for applying pressure on the instrument for insertion and for adjustment in position, as well as for facilitating the removal of the instrument.

Such means comprises a collar, 56, adapted to fit over tube 10, with an outer diameter adapted to fit snugly within the space between the flange 36 provided on the distal side of plate 16 and the tube 10. Collar 56 may be of appreciable altitude and may have a pair of wings extending therefrom in diametrically opposed relation. One of said wings, 58, may be shorter than the other of said wings, 60, with both of said wings being slightly tilted, in the same direction, relative to the axis of the collar 56. Means are provided for orienting and retaining the collar 56 on tube 10 in a manner that the longer wing 60 proximally tilted and underlying cleft 22, in position to contact the body dorsally of the anal orifice to thereby inhibit saggital displacement of the instrument in a dorsal direction, after the instrument is in place on the body. Collar 56 and plate 16 may be interlocked with the wing 60 in properly oriented position, as by means of cooperating detent notch and projection, one of which, as the detent notch, 62, may be formed on the outer surface of the upper edge of collar 56, with the detent projection, 64, formed on the inner surface of flange 36 of plate 16.

It may here be stated that the tube 10 may be formed with different-sized bores, as, for instance, for the purpose of administering medication into the intestinal tract rather than a barium suspension.

This completes the description of the applicator of the present invention. It will be apparent that it is simple, easy to use, and highly convenient for rapid and neat administration of fluid into the intestinal tract, and that it is self-retained by the body when in place and forms a substantially complete seal against leakage. It will also be apparent that the applicator of the present invention may be mass produced at low cost, to be discarded after a single use.

We claim:

1. An instrument for administering fluids into the intestinal tract per rectum, comprising a tube having a proximal, body entering end, means surrounding said tube distally of said end for sealing the anal orifice of said rectum, said means comprising a first enlargement surrounding said tube and having a proximal surface substantially radially normal to said tube, said surface arranged to contact the marginal body edge portion surrounding the anal orifice, said surface being formed with an edge curving proximally to define a generally hollow recess adapted to be pressed into said marginal body portion, whereby said orifice is sealed when said end is disposed within said rectum, and means on said tube disposed distally of said first enlargement and of greater dimension than said first enlargement engageable in body portions spaced from said anal orifice and holdable by said body portions for immobilizing said instrument in said sealing position.

2. The instrument of claim 1, wherein a conical, proximally tapering enlargement of the wall of said tube rises from a midpoint of said surface, concentrically with said tube and adapted to enter the anal canal when said surface is brought into contact with said marginal body portion.

3. The instrument of claim 2, wherein said conical enlargement is formed with a shoulder surrounding said tube adjacent the proximal end thereof.

4. The instrument of claim 3, wherein said conical enlargement is formed with a proximally facing shoulder substantially normal to the longitudinal axis of said tube in spaced relation to its proximal end, to thereby provide a proximal conical portion of reduced cross section around said tube.

5. The instrument of claim 1, wherein said body engageable means comprises a second enlargement surrounding said tube, of greater area than said surface, said second enlargement substantially radially normal to the longitudinal axis of said tube, said second enlargement having opposed portions engageable by portions of the body distally spaced from said anal orifice.

6. The instrument of claim 5, wherein said second enlargement comprises a substantially heart-shaped plate and includes lobe portions spaced by a cleft formed in the edge of said plate, said lobes proximally curved.

7. The instrument of claim 6, wherein the marginal edge portions of said plate are proximally curved to form a raised edge therefor.

8. The instrument of claim 6, wherein said anal sealing enlargement comprises a stud integral with and rising from a midpoint of said plate and concentric with said tube.

9. The instrument of claim 8, wherein a proximally tapering ring is fitted about said cylindrical stud.

10. The instrument of claim 6, wherein said first enlargement having said anal sealing surface extends and tapers proximally from a midpoint of said plate.

11. The instrument of claim 1, wherein said body entering end is formed with a terminal bulbous enlargement forming a body entering head, said head formed with an integral hollow stem portion connected with said tube.

12. The instrument of claim 11, wherein said head is of substantially spherical shape and is formed with a bore of greater cross section than said tube and disposed with its longitudinal axis at an angle to the longitudinal axis of said tube, to thereby provide an obliquely disposed opening for said head bore.

13. The instrument of claim 6, wherein a collar is removably fitted on said tube against the distal surface of said plate, said collar having diametrically opposed extensions, one of said extensions being longer than the other; said extensions curved proximally.

14. The instrument of claim 13, wherein means are provided for interengaging said collar and said plate when said longer extension is in said overlapping position, against rotation of said collar around said tube.

15. The instrument of claim 14, wherein said interengaging means comprises a circular flange on the distal face of said plate concentric with said tube and spaced therefrom a distance to accommodate a marginal edge portion of said collar and cooperating interengageable detent recess and detent projection formed on the inner face of said flange and the outer surface of said marginal edge portion of said collar.